United States Patent

Balsiger

(12)

(10) Patent No.: US 6,211,588 B1
(45) Date of Patent: Apr. 3, 2001

(54) ELECTROMOTER HAVING A POSITION SENSOR WITH A PLURALITY OF FIELD SENSITIVE ELEMENTS ON A SEMICONDUCTOR CHIP

(75) Inventor: Werner Balsiger, Kerzers (CH)

(73) Assignee: Saia-Burgess Electronics AG, Murten (CH)

( * ) Notice: Subject to any disclaimer, the term of this patent is extended or adjusted under 35 U.S.C. 154(b) by 0 days.

(21) Appl. No.: 09/199,286

(22) Filed: Nov. 25, 1998

(30) Foreign Application Priority Data

Nov. 28, 1997 (CH) .................................................. 2749/97

(51) Int. Cl.⁷ ............................ H02K 29/06; H02K 29/08
(52) U.S. Cl. ........................ 310/68 B; 310/156; 324/207.2
(58) Field of Search .............................. 310/68 B, 156, 310/90; 324/174, 173, 207.2, 207.21

(56) References Cited

U.S. PATENT DOCUMENTS

| | | | |
|---|---|---|---|
| 3,553,511 | * 1/1971 | Hemmings | 310/156 |
| 3,872,334 | * 3/1975 | Loubier | 310/43 |
| 4,074,173 | 2/1978 | Janssen | 318/138 |
| 4,801,881 | * 1/1989 | Kawata | 324/208 |
| 5,047,716 | * 9/1991 | Katagiri | 324/207.21 |
| 5,089,733 | * 2/1992 | Fukuoka | 310/67 R |
| 5,293,125 | * 3/1994 | Griffen et al. | 324/173 |
| 5,554,933 | * 9/1996 | Logue | 324/233 |
| 5,640,090 | 6/1997 | Furuya et al. | 324/251 |

FOREIGN PATENT DOCUMENTS

| | | |
|---|---|---|
| 35 19 901 | 12/1986 | (DE) . |
| 0 590 222 | 4/1994 | (EP) . |
| 2155303 | 5/1973 | (FR) . |
| 2 304 206 | 10/1976 | (FR) . |

OTHER PUBLICATIONS

Patent Abstracts of Japan, vol. 013, No. 383 (E–811), Aug. 24, 1989 & JP 01 133594 A (Secoh Giken. Inc.), May 25, 1989.

Patent Abstracts of Japan, vol. 097, No. 10, Oct. 31, 1997 & JP 09 163706 A (Sharp Corp), Jun. 20, 1997.

* cited by examiner

*Primary Examiner*—Karl E. Tamai
(74) *Attorney, Agent, or Firm*—Foley & Lardner

(57) ABSTRACT

In a compact low-cost brushless D.C. motor, a measuring magnetization zone (24) is provided near the rotational axis (7) whose division into magnetic poles (14, 15) is aligned to that of the driving magnetization zone (6) of the rotor (4). The measuring magnetization zone (24) is essentially annular in design and its diameter is so small that the Hall elements (16) necessary for the detection of a complete north/south magnetization period can be integrated on a semiconductor chip of presently current size. The assembly of the sensor (13) containing such a chip necessarily involves a number of error sources on account of manufacturing conditions (sensitivity tolerances of Hall elements 16), on one hand, and of the limited adjusting possibilities. However, the resulting deviations from the ideal signal can be compensated by corresponding corrections in the evaluating electronics and by providing a number of redundant Hall elements (18). The latter allow to find an optimum selection among a greater number of Hall elements (16, 18) than necessary in the course of an adjusting run in the assembled motor.

16 Claims, 3 Drawing Sheets

ELECTROMOTER HAVING A POSITION SENSOR WITH A PLURALITY OF FIELD SENSITIVE ELEMENTS ON A SEMICONDUCTOR CHIP

FIELD OF THE INVENTION

The present invention refers to a brushless electromotor comprising a rotor having a permanently magnetized propulsion magnetization zone with at least one pair of magnetic poles, and a stationary coil assembly with at least one stator coil, said rotor being rotationally movable by the magnetic fields of said stator coils.

BACKGROUND OF THE INVENTION

Brushless D.C. motors essentially comprise a rotor in the form of a multipolar permanent magnet. The rotor is rotated by electronic commutation of the current in the stator coils. For this control of the current in the stator coils it is necessary to determine the position of the rotor as precisely as possible: the more precisely the position of the rotor is known, the more precisely the total field of the stator coils may be adjusted for a smooth operation resp. the position of the rotor may be regulated e.g. if an actuator is concerned.

A known measuring method of the rotor position is to arrange Hall elements in the area of the rotor, i.e. usually near its circumference, an electric parameter of which varies in function of a magnetic field, e.g. the Hall voltage or the resistance. Unless it is provided with the magnetization for the propulsion of the rotor anyway, the area of the rotor which travels past the Hall elements receives a particular magnetization whose division and position exactly corresponds to the magnetization which serves for the propulsion.

The disadvantage of the known embodiment is that the Hall elements must be adjusted very precisely in order to obtain an optimum commutation of the stator coil current. Since the Hall elements are discrete components, each Hall element generally has to be mounted and adjusted individually. Altogether, this results in a relatively complicated construction, a laborious adjustment and high requirements with respect to the positioning precision.

According to FR-A-2 155 303, the axle e.g. of a motor is provided with a magnet assembly, and a quantitative detection of the rotation of the axle in fractions of turns is effected by means of a magnet sensor which scans the magnet assembly. In one embodiment, the magnet assembly essentially consists of two annular magnets which are disposed at a certain distance from each other and comprise a number of axial magnetizations. The disposition of the two magnets is such that an annular zone with an axial magnetic field of changing polarity is formed in the gap between the magnets while the field lines are almost parallel at the center of the gap. The multiple sensor disposed in this gap responds when a respective threshold of every sensor is exceeded or not attained, whence the position of the magnet assembly is deduced. The construction of the magnet assembly results in relatively high field intensities and sharp transitions between the different magnetization zones. The number of sensors is chosen such that the series of sensors is shorter than a complete magnetization zone.

This disposition requires an additional, special measuring magnet, and on account of the construction size, the overall conception requires magnetic field sensors in the form of discrete components. An integration of the Hall elements on a chip is not mentioned either.

EP-A-0 590 222 describes a linear position detector which comprises a number of Hall elements which are integrated in a semiconductor chip. The two respective adjacent Hall elements are determined between which the magnetic induction generated e.g. by a magnet which is displaceably arranged above the sensor passes through zero. The resolution of this detector corresponds to the distance between two Hall elements. If used for the detection of an arcuate movement, at least the problem of the tangential positioning error remains unsolved, and the increased requirements for a continuous and ungradated detection of the rotational position of the rotor of a D.C. motor for the generation of a continuous stator coil current are not mentioned.

SUMMARY OF THE INVENTION

An object of the present invention is to provide a brushless electromotor comprising a rotational position sensor which allows a more economical overall motor manufacture.

Another object is to design the detection device in such a manner as to allow an increased arithmetic resolution of the rotational position detection.

At least one of the mentioned objects is attained by an electromotor wherein a permanently magnetized measuring magnetization zone is provided on the rotor and a sensor is disposed in the range of the magnetic field of said measuring magnetization zone, said sensor comprising an arrangement of at least five elements which are sensitive to the magnetic field and are integrated on a semiconductor chip in a straight or curved row essentially, and which cover more than one period of the measuring magnetization, so that the position of the rotor can be determined with high precision from the output signal of said field-sensitive elements, which is generated by the action of the magnetic field of the measuring magnetization zone, by numeric correlation of the measuring signals with a predetermined reference curve corresponding to one or several period(s). Further preferred embodiments of such an electromotor are described herein.

In the D.C. motor of the invention, the magnetization zone which serves for the measurement of the rotor positions is disposed very close to the rotational axis of the rotor. Furthermore, this magnetization zone is essentially annular in shape, and its magnetization is preferably parallel to the rotational axis. Thus, the position of the rotor may be detected by a number of Hall elements which are preferably disposed on a circle arc section and which may be integrated in an economical manner on a semiconductor chip due to the small spatial dimension of the measuring magnetization zone. According to presently used chip sizes, the arc length on which the Hall elements used for the measurement are formed is smaller than 5 mm and preferably 3 mm at the most. However, greater arc lengths are not completely excluded, but in the case of an integration on a single chip, this would be increasingly uneconomical.

In order to avoid complicated adjustments particularly in the tangential direction in spite of the small dimensions and the strong curvature of the measuring arrangement, a greater number of Hall elements than necessary for the measurement is generally provided. The tangential displacement can be realized by the selection of a group of Hall elements from the number of available Hall elements. If integrated on a chip, redundant Hall elements can be provided economically as well.

Preferentially, the arcuate line on which the Hall elements are disposed on the chip may have a smaller curvature than the desired measuring line in the measuring magnetization zone. As the measuring magnetization poles become very narrow near the axle, the available magnetic field intensity is also strongly reduced, especially at a distance of the Hall elements resp. of the chip from the measuring magnetization surface in the millimeter range. This again results in increased requirements with respect to the positioning precision, which can be fulfilled by the redundant measuring elements in a surprisingly effective manner, however.

BRIEF DESCRIPTION OF THE DRAWINGS

The invention will be further explained by way of an exemplary embodiment and with reference to figures.

DETAILED DESCRIPTION OF THE INVENTION

Figure 1:
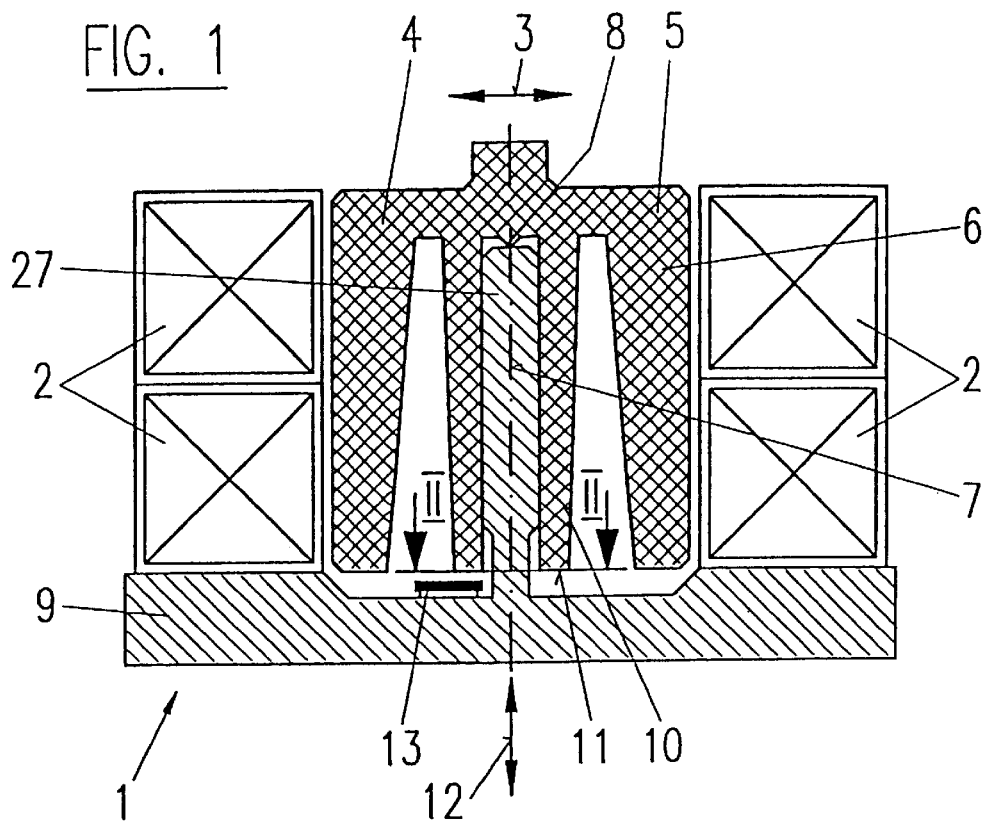
FIG. 1 shows a cross-section of an elementary representation of a D.C. motor.

FIG. 1 shows an elementary representation of a D.C. motor 1 comprising a stator coil 2 which is capable of generating a magnetic field in the direction of arrow 3. Another stator coil generates e.g. a magnetic field perpendicular to the plane of the drawing, so that the commutation of the coil current allows to generate a rotary field whose direction is essentially defined by a rotation of arrow 3 around rotational axis 7 of the motor. So far, it is a usual brushless D.C. motor.

Rotor 4 essentially consists of a magnetizable ferrite material with a polymer binding additive, and it is produced by injection-molding. It comprises an essentially cylindrical outer envelope 6 which is magnetized perpendicularly to rotational axis 7 of the motor while forming six pairs of magnetic poles. It is thus identical to propulsion magnetization zone 5. Rotor 4 is rotatably mounted on stationary axle 27. For this purpose, rotor 4 is provided with a bearing point 8 which allows a small friction when rotating around axle 27. Axle 27 is fixed to stator 9 of the motor.

For further guidance, rotor 4 comprises a guiding sleeve 10 which surrounds axle 27. The lower end 11 of sleeve 10 is provided with the measuring magnetization in parallel to rotational axis 7 (arrow 12, FIG. 2). Like the propulsion magnetization zone, this measuring magnetization zone consists of six pairs of magnetic poles which are precisely aligned to the poles of propulsion magnetization zone 5.

Sensor 13 is disposed near the lower end 11 of sleeve 10, so that the magnetic fields emanating from the measuring magnetization zone can produce a signal in the field-sensitive parts of sensor 13.

Figure 2:
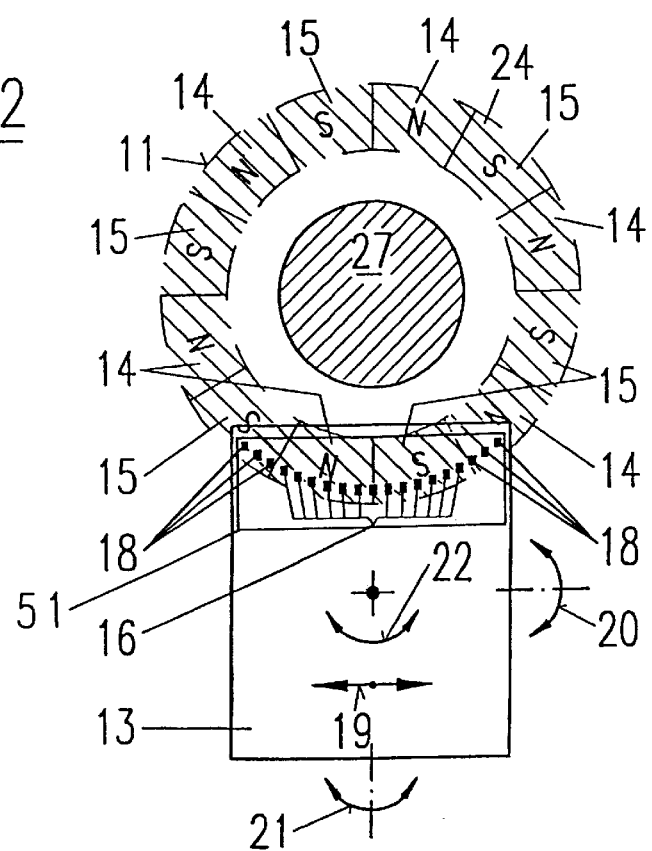
FIG. 2 shows a cross-section according to section line II—II in FIG. 1.

FIG. 2 shows the arrangement of sensor 13 on a strongly enlarged scale. The annular end 11 of guiding sleeve 10 is magnetized to form a measuring magnetization zone 24 which is divided into six pairs of magnetic poles (north poles 14, south poles 15) whose magnetization direction is perpendicular to the plane of the drawing. Sensor 13 comprises a number of Hall elements 16 in an arc-shaped arrangement which is adapted to the shape of end 11 in the area of two adjacent poles 14, 15. On both ends of Hall element arrangement 16, redundant Hall elements 18 are added whose signification will be explained hereinafter. Hall elements 16, 18 are integrated on a semiconductor chip 51 and preferably combined at least with parts of the control and evaluation electronics. Under consideration of the particular requirements of the invention as discussed below, these electronics may be designed according to known principles, so that a further, detailed explanation of the same is superfluous.

Essentially, in order to determine the position of rotor 4, the limit between a north and a south pole 14 resp. 15 is used where the signal supplied by Hall elements 16 exhibits a crossover or a relatively sharp extreme. For a precise determination of this limit, such a number of Hall elements 16 is used that the length of the covered arc corresponds to a full polarization period of measuring magnetization zone 24. Possible tolerances are compensated by redundant Hall elements 18. In a calibration procedure after the assembly of the motor, it is determined how many and which Hall elements 16, 18 are necessary in order to cover such a full magnetization period. Only the signals of the Hall elements 16 designated in this manner are evaluated for the operation of motor 1.

Since it is preferred to detect a complete magnetization period and today's current chip dimensions are up to approx. 5 mm, essentially the same maximum arc length can be covered by the Hall generators 16, 18, which means that the diameter of measuring magnetization zone 24, which in the present case is identical to lower end 11, must have a correspondingly small radius such as a radius of 5 mm at the most, and preferably of 3 mm at the most. Preferably, however, the arc length covered by Hall elements 16, 18 is smaller, i.e. around 3 mm or less, for example.

Sensor 13 may be subject to positioning errors with respect to the measuring magnetization as indicated by arrows 19 (tangentially displaced), 20 (tilted around the x axis or tangentially twisted), and 21 (tilted around the y axis or radially twisted). A twisting according to arrow 22 around the z axis perpendicularly to the plane of the drawing corresponds to a tangential displacement according to arrow 19 and may therefore be treated in the same way.

A radial twisting (arrow 21) results in a variation of the frequency resp. of the number of Hall elements 16 which are necessary in order to cover an entire magnetization period. A compensation may be obtained by the application of additional Hall elements out of the redundant Hall elements 18. A tangential twisting according to arrow 20 results in a mere amplitude variation. However, this error is attenuated by the fact that the relatively sharp transition between the north and the south pole is being determined, on one hand, and that a correction of the weighting of the amplitude of the signal supplied by each one of the Hall generators 16 may be effected, on the other hand. This correction may be determined in a calibrating procedure after the assembly of the motor and permanently stored in the evaluating electronics. In contrast, a tangential displacement according to arrow 19 results in a phase error, i.e. the position of rotor 4 is determined with an angular deviation corresponding to the tangential displacement. This error may be corrected by the selection of the Hall elements 16 from the total number of available Hall elements 16, 18 as well, i.e. by defining the measuring zone in such a manner as to compensate the displacement 19.

Another source of errors is the considerable relative and absolute dispersion of the parameters of Hall elements 16, 18. As indicated above with respect to the other error sources, a compensation of these effects may also be obtained in an adjusting procedure in the assembled motor. The usual parameter for an optimum adjustment is a maximum idle speed of the motor. Mathematical methods and algorithms allowing to determine such an optimum in function of a large number of partly interdependent parameters are known per se.

In contrast to usual rotors, rotor 4 according to the exemplary embodiment is injection-molded in one piece from a ferrite material containing a synthetic binding agent. Instead, conventional rotors comprise a steel axle around which the propulsion portion is injected from a ferrite material. However, on account of the poor running properties and stability of the ferrite material, whose running and bearing surfaces are therefore subject to a relatively high wear, the latter are preferably protected by steel elements also in view of a free rotation of the rotor.

It will be noted that in the extreme case, sensor 13 may contain the entire control electronics of the motor, i.e. also the high-current drivers for coils 2, for example, thus allowing a hitherto unattained simplification and compactness of the D.C. motor.

In this case, the motor would ultimately only require power supply terminals and inputs allowing to set a position and/or a rotational speed.

Modifications of the represented embodiment are apparent to those skilled in the art from the description without leaving the scope of the invention. Some of the possible modifications are indicated hereinafter:

Another number of pole pairs can be used.

An unaligned disposition of the magnetization limits of the propulsion magnetization zone and of the measuring magnetization zone is also conceivable as the position of the rotor can be determined independently thereof. In this case, however, compared to a disposition where the magnetization limits are basically aligned, additional measures are necessary in order to shift the phase in the commutation of the coil current.

Figure 3:
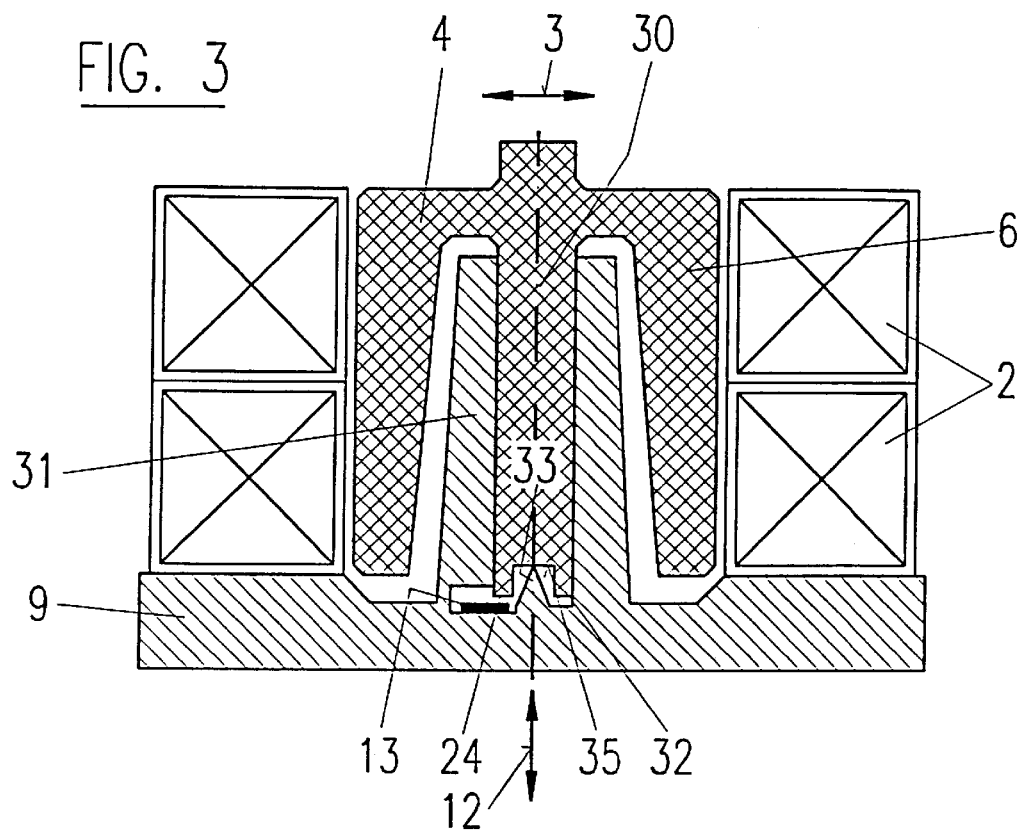
FIGS. 3 to 5 show cross-sections in analogy to FIG. 1 of further embodiments of D.C. motors.
Figure 4:
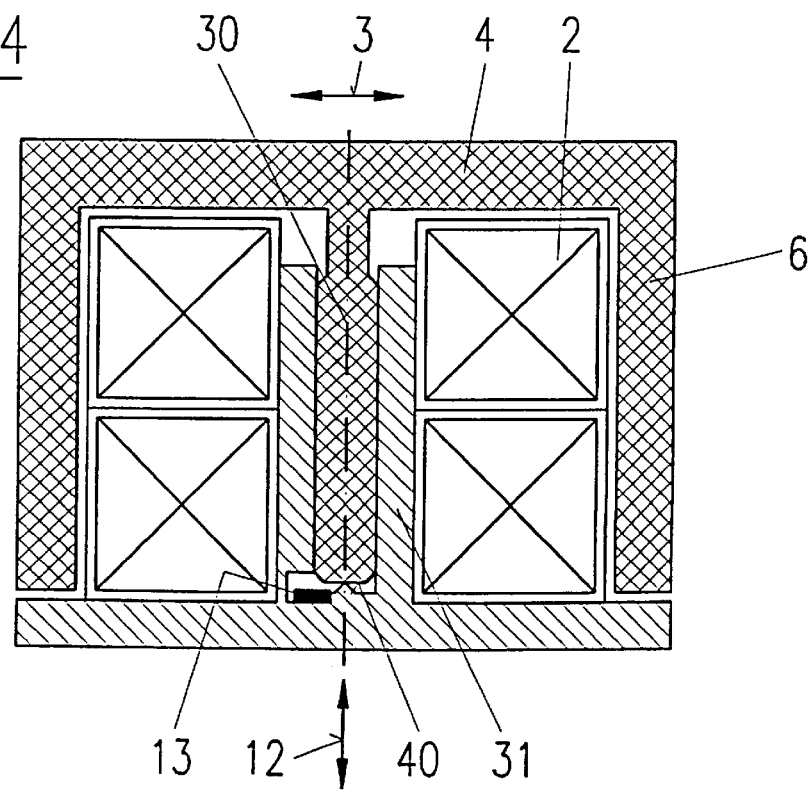
Figure 5:
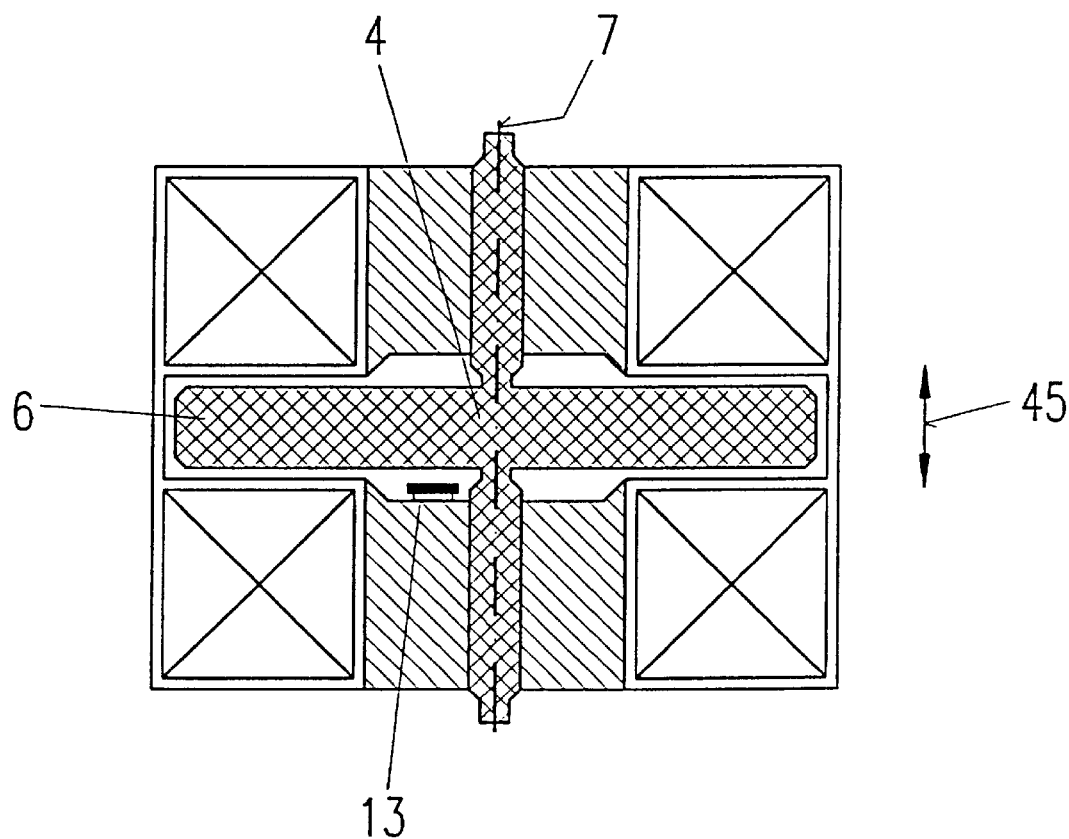

Other possible rotor shapes are shown in FIGS. 3 to 5, where elements corresponding to FIGS. 1 and 2 are designated by the same reference numerals: Rotor 4 of FIG. 3 comprises an axle 30 which is guided in a cylindrical guide 31 of the stator and rests on a point 33. Axle 30 is provided with a collar 32 which extends around seat 34 and whose annular front surface includes measuring magnetization zone 24 which is magnetized in the direction of arrow 12. Sensor 13 is disposed in a recess 34 of guiding sleeve 31.

Similarly to the rotor of FIG. 3, rotor 40 of FIG. 4, an external rotor, is provided with a central axle while its driving portion 6 extends around coils 2. A collar 32 for the measuring magnetization is omitted, the lower end 40 of shaft 30 being provided with the measuring magnetization zone instead. Here also, sensor 13 is again disposed in a recess of guiding sleeve 31.

FIG. 5 finally shows a rotor 4 having a disk-shaped driving portion 6. Here, the propulsion magnetization of driving portion 6 follows the direction of arrow 45, i.e. it is parallel to axle 4, and the magnetization extends near axle 4, so that its magnetic field is also detected by sensor 13 which is disposed near axle 4. Consequently, in this embodiment, it is not necessary to provide two distinct magnetizations for the propulsion magnetization zone and the measuring magnetization zone.

The motor may also have a different number of coils while two coils are both a current configuration and the minimum 10 used in practice. Other current coil numbers are 1, 2, 3, 5, and 7. The possibility to use only one coil is thus not excluded. The rotor might also consist of another permanently magnetizable material, at least those elements which must be magnetized. The axle of the rotor might be made of steel with a synthetic material injected thereon. One or both ends of the axle might pass through the housing of the motor, as shown in the embodiment of FIG. 5.

Another number of Hall elements may be provided. Although the complications of the evaluation increase with the number of Hall elements, the higher resolution of the position also allows an increasingly continuous commutation of the coil current. The minimal discretisation of the rotor position is determined in a manner known per se by the number of coils of the stator. Possible numbers of Hall generators are e.g. 5(4), 10(8), 20(16), the number of adjacent Hall elements which are selected among the total number for the measurement being indicated in parentheses. Powers of 2 are particularly suitable for today's numerical methods while other numbers are possible if different evaluating methods are used. The number of redundant Hall sensors is downwardly limited by the resulting tolerance with respect to adjusting errors. Conversely, an upper limit is imposed by the manufacturing costs and the size of the available chip surface. Thus, the number of the field-sensitive elements is an integral power of two, more particularly 4, 8, 16 or 32, plus at least 1, preferably 1 to 4, and/or up to 25% of the respective power of two.

Another definition of redundancy may be expressed in percent, especially if greater numbers of Hall generators are concerned. The redundancy should not be less than 10% of the number of Hall generators intended for the group of Hall generators required for the measurement. A preferred range is between 20% and 50%.

Finally, an arrangement of Hall generators 16 could be provided which covers more than one magnetization period, e.g. an integral multiple of a magnetization period in the case of multiple poles.

In order to determine the rotor position, the following alternatives are possible, amongst others:

1. The signal of the Hall elements is correlated with a predetermined reference function, e.g. a sinusoidal one, while the phase of said reference function is optimized for maximum correlation. The position of the rotor can be determined by the means of this phase relation and by the reference function itself.

2. The signal of the Hall elements is analyzed by a method such as a Fourier transformation, and the obtained proportions of ideal functions allow to determine the rotor position. In the case of the Fourier transformation, coefficients for sine and cosine functions are calculated, and the first harmonic is generally considered in order to determine the rotor position.

Preferably, these methods make use of the fact that the active Hall generators cover exactly one measuring magnetization period or an integral multiple thereof: in this case, an additional correlation condition may be that the sum of the signals of all Hall elements, possibly after having determined a correction function in the manufacture of the motor, must be zero.

What is claimed is:

1. A brushless electromotor comprising:
    a rotor having a permanently magnetized propulsion magnetization zone with at least one pair of magnetic poles,
    a stationary coil assembly with at least one stator coil, said rotor being rotationally movable by magnetic fields of said at least one stator coil, said rotor having a permanently magnetized measuring magnetization zone; and
    a sensor disposed in the range of the magnetic field of said measuring magnetization zone, said sensor comprising an arrangement of at least five field-sensitive elements which are sensitive to the magnetic field and are integrated on a semiconductor chip in a row and are each coupled to circuitry on said semiconductor chip, with at least four of said field-sensitive elements covering a period of the measuring magnetization and with at least one of said field-sensitive elements being a redundant field-sensitive element arranged outside said period of the measuring magnetization, and in which said at least five field-sensitive elements cover more than one period of the measuring magnetization, so that a position of the rotor can be determined with high precision from an output signal of said field-sensitive elements, which is generated by the action of the magnetic field of the measuring magnetization zone, by numeric correlation of the measuring signals with a predetermined reference curve corresponding to one or several period(s), wherein a total number of said field-sensitive elements is equal to an integral power of two plus at least 1 redundant field-sensitive element and wherein a number of said redundant field-sensitive elements is from 10% to 50% of said integral power of two.

2. The electromotor of claim 1, wherein the distance between a first and a last element of an arrangement of said field-sensitive elements is no more than 5 mm.

3. The electromotor of claim 1, wherein the measuring magnetization zone surrounds a rotational axis of the rotor in an essentially annular shape, is magnetized essentially in parallel to the rotational axis, and wherein the arrangement of field-sensitive elements is in the form of an accurate row adapted to the configuration of the measuring magnetization zone.

4. The electromotor of claim 1, wherein the rotor is in one piece and made of a magnetizable ferrite material essentially.

5. The electromotor of claim 1, wherein the measuring magnetization zone is formed by a portion which surrounds the rotational axis of the rotor in an annular configuration, and having a radius of 5 mm at the most.

6. The electromotor of claim 1, wherein the measuring magnetization zone comprises the same number of north and south poles as the driving magnetization zone, and which are aligned to provide maximum synchronism of the two magnetization zones with respect to said stator coils and said sensor.

7. The electromotor of claim 1, wherein all of said field-sensitive elements are disposed on said semiconductor chip in the form of components which are integrated thereon.

8. The electromotor of claim 1, wherein a rotor positioning control circuit is provided on said semiconductor chip said semiconductor chip also including high-current components for the control of the stator coil current, so that the motor merely comprises power supply terminals and inputs allowing to set a rotor position and/or a rotational speed.

9. The electromotor of claim 1, wherein said field sensitive elements are integrated on a semiconductor chip in a curved row.

10. The electromotor of claim 1, wherein said total number of said field-sensitive elements is equal to an integral power of two having a value of at least four plus a number of said redundant field-sensitive elements up to 25% of said integral power of two.

11. The electromotor of claim 1, wherein a number of said redundant field-sensitive elements is from 20% to 50% of said integral power of two.

12. The electromotor of claim 1, wherein the distance between a first and a last element of an arrangement of said field-sensitive elements is no more than 3 mm.

13. The electromotor of claim 1, wherein the measuring magnetization zone is formed by a portion which surrounds the rotational axis of the rotor in an annular configuration, and having a radius of 3 mm at the most.

14. A brushless electromotor comprising:
  a rotor having a permanently magnetized propulsion magnetization zone with at least one pair of magnetic poles and having a permanently magnetized measuring magnetization zone;
  a stationary coil assembly with at least one stator coil, said rotor being rotationally movable by magnetic fields of said at least one stator coil;
  a sensor disposed in a range of a magnetic field of said measuring magnetization zone, said sensor comprising an arrangement of at least five field-sensitive elements which are sensitive to said magnetic field and are integrated on a semiconductor chip for accurately determining a position of said rotor, said arrangement of at least five field-sensitive elements covering more than one period of said measuring magnetization, said arrangement of at least five field-sensitive elements being comprised of a first set of Hall elements covering a period of the measuring magnetization and a second set of redundant Hall elements arranged outside said period of the measuring magnetization, said first and second sets being coupled to circuitry on said semiconductor chip and disposed on said semiconductor chip in a circular arc section about an axis of said rotor, wherein a number of Hall elements in said first set equal to an integral power of two, having a value of at least four and a number of said redundant Hall elements is from about 20% to about 50m% of said integral power of two.

15. The electromotor of claim 14, wherein an accuracy of a measurement of a tangential displacement of said rotor position is determined in proportion to a number of selected Hall elements from said first set and redundant Hall elements from said second set.

16. The electromotor of claim 14, wherein a rotational position of the rotor can be determined from an output signal of said field-sensitive elements, which is generated by the action of the magnetic field of the measuring magnetization zone, by numeric correlation of the measuring signals with a predetermined reference curve corresponding to one or more periods.

* * * * *